United States Patent
Uliyar et al.

(10) Patent No.: US 10,176,558 B2
(45) Date of Patent: Jan. 8, 2019

(54) METHOD, APPARATUS AND COMPUTER PROGRAM PRODUCT FOR MOTION DEBLURRING OF IMAGES

(71) Applicant: Nokia Technologies Oy, Espoo (FI)

(72) Inventors: Mithun Uliyar, Bangalore (IN); Krishna Govindarao, Bangalore (IN); Gururaj Putraya, Bangalore (IN); Basavaraja S V, Bangalore (IN)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/539,744

(22) PCT Filed: Dec. 1, 2015

(86) PCT No.: PCT/FI2015/050839
§ 371 (c)(1),
(2) Date: Jun. 26, 2017

(87) PCT Pub. No.: WO2016/107961
PCT Pub. Date: Jul. 7, 2016

(65) Prior Publication Data
US 2017/0352136 A1    Dec. 7, 2017

(30) Foreign Application Priority Data
Dec. 29, 2014   (IN) .......................... 6677/CHE/2014

(51) Int. Cl.
*H04N 5/353*    (2011.01)
*G06T 5/00*    (2006.01)
(Continued)

(52) U.S. Cl.
CPC .............. *G06T 5/003* (2013.01); *G06T 7/292* (2017.01); *H04N 5/211* (2013.01); *H04N 5/247* (2013.01);
(Continued)

(58) Field of Classification Search
CPC . G06T 2207/10004; G06T 2207/20201; G06T 5/003; G06T 7/292; H04N 5/211; H04N 5/247; H04N 5/353
See application file for complete search history.

(56) References Cited

U.S. PATENT DOCUMENTS

| 7,580,620 | B2 | 8/2009 | Raskar et al. |
| 8,390,704 | B2 | 3/2013 | Wang et al. |

(Continued)

FOREIGN PATENT DOCUMENTS

EP    2590396 A1    5/2013

OTHER PUBLICATIONS

Raskar et al., "Coded Exposure Photography: Motion Deblurring using Fluttered Shutter", ACM Transactions on Graphics, vol. 25, No. 3, Jul. 30-Aug. 3, 2006, pp. 795-804.
(Continued)

*Primary Examiner* — Amy R Hsu
(74) *Attorney, Agent, or Firm* — Nokia Technologies Oy

(57) ABSTRACT

In an example embodiment a method, apparatus and computer program product are provided. The method includes determining presence of at least one moving object in a scene based on two or more burst images corresponding to the scene captured by a first camera. One or more portions of the scene associated with the at least one moving object are identified, and, information related to the one or more portions is provided to a second camera. An image of the scene captured by the second camera second camera is received, where a pixel level shutter disposed in front of an image sensor of the second camera is programmed to periodically open and close, throughout a duration of said image capture, for pixels of the image sensor corresponding to the one or more portions of the scene. A deblurred image corresponding to the scene is generated based on the image.

17 Claims, 8 Drawing Sheets

(51) Int. Cl.
*G06T 7/292* (2017.01)
*H04N 5/21* (2006.01)
*H04N 5/247* (2006.01)
*G01B 11/245* (2006.01)

(52) U.S. Cl.
CPC ........... *H04N 5/353* (2013.01); *G01B 11/245* (2013.01); *G06T 2207/10004* (2013.01); *G06T 2207/20201* (2013.01)

(56) References Cited

U.S. PATENT DOCUMENTS

| | | | | |
|---|---|---|---|---|
| 8,405,763 | B2* | 3/2013 | Veeraraghavan | H04N 5/2254 348/222.1 |
| 8,436,907 | B2* | 5/2013 | McCloskey | G06K 7/10 348/208.4 |
| 2010/0182440 | A1* | 7/2010 | McCloskey | G06K 7/10 348/208.4 |
| 2011/0090378 | A1 | 4/2011 | Wang et al. | |
| 2012/0257101 | A1* | 10/2012 | Bub | H04N 1/195 348/362 |
| 2013/0021447 | A1* | 1/2013 | Brisedoux | H04N 5/2258 348/47 |
| 2014/0240492 | A1* | 8/2014 | Lee | H04N 5/2256 348/136 |
| 2015/0163406 | A1* | 6/2015 | Laroia | G02B 27/58 348/208.1 |

OTHER PUBLICATIONS

Sen et al., "Robust Patch-Based HDR Reconstruction of Dynamic Scenes", ACM Transactions on Graphics, vol. 31, No. 6, Nov. 2012, 12 pages.

Tai et al., "Image/video Deblurring Using a Hybrid Camera", IEEE Conference on Computer Vision and Pattern Recognition, Jun. 23-28, 2008, pp. 1-8.

Li et al., "Hybrid Camera for Motion Deblurring and Depth Map Super-Resolution", IEEE Conference on Computer Vision and Pattern Recognition, Jun. 23-28, 2008, 8 pages.

International Search Report and Written Opinion received for corresponding Patent Cooperation Treaty Application No. PCT/FI2015/050839, dated Mar. 31, 2016, 14 pages.

Holloway et al., "Flutter Shutter Video Camera for Compressive Sensing of Videos", IEEE International Conference on Computational Photography, Apr. 28-29, 2012, 9 pages.

Extended European Search Report received for corresponding European Patent Application No. 15875297.2, dated May 15, 2018, 9 pages.

* cited by examiner

METHOD, APPARATUS AND COMPUTER PROGRAM PRODUCT FOR MOTION DEBLURRING OF IMAGES

RELATED APPLICATION

This application was originally filed as Patent Cooperation Treaty Application No. PCT/FI2015/050839 filed Dec. 1, 2015 which claims priority benefit to Indian Patent Application No. 6677/CHE/2014, filed Dec. 29, 2014.

TECHNICAL FIELD

Various embodiments, relate generally to method, apparatus, and computer program product for motion deblurring of images.

BACKGROUND

Capturing images of scenes in low-light conditions often necessitate increasing an exposure time of a camera. Increasing the exposure time of the camera allows more light inside the camera thereby aiding in image-capture of scenes in low-light conditions. However, if a scene to be captured in low-light condition includes objects in motion, such as walking/running people, moving cars etc., then motion artifacts are introduced in the captured image if the exposure time is significantly large. The presence of motion artifacts, which are observed in form of blurring of objects associated with motion, degrades a quality of the captured image.

SUMMARY OF SOME EMBODIMENTS

Various example embodiments are set out in the claims.

In a first embodiment, there is provided a method comprising: determining presence of at least one moving object in a scene based on two or more burst images corresponding to the scene captured by a first camera, the two or more burst images associated with a first exposure time; identifying one or more portions of the scene associated with the at least one moving object if the at least one moving object is determined to be present in the scene; providing information related to the one or more portions of the scene to a second camera, the second camera configured to capture single exposure images associated with a second exposure time, the second exposure time greater than the first exposure time; receiving an image of the scene captured by the second camera, wherein a pixel level shutter disposed in front of an image sensor of the second camera is programmed to periodically open and close, throughout a duration of said image capture, for pixels of the aimage sensor corresponding to the one or more portions of the scene; and generating a deblurred image corresponding to the scene based on the image.

In a second embodiment, there is provided an apparatus comprising: at least one processor; and at least one memory comprising computer program code, the at least one memory and the computer program code configured to, with the at least one processor, cause the apparatus to at least perform: determine presence of at least one moving object in a scene based on two or more burst images corresponding to the scene captured by a first camera, the two or more burst images associated with a first exposure time; identify one or more portions of the scene associated with the at least one moving object if the at least one moving object is determined to be present in the scene; provide information related to the one or more portions of the scene to a second camera, the second camera configured to capture single exposure images associated with a second exposure time, the second exposure time greater than the first exposure time; receive an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and generate a deblurred image corresponding to the scene based on the image.

In a third embodiment, there is provided an apparatus comprising: a camera module, the camera module comprising: a first camera configured to capture burst images associated with a first exposure time, a second camera configured to capture single exposure images associated with a second exposure time, the second exposure time greater than the first exposure time, and a pixel level shutter disposed in front of an image sensor of the second camera; at least one processor; and at least one memory comprising computer program code, the at least one memory and the computer program code configured to, with the at least one processor, cause the apparatus to at least perform: determine presence of at least one moving object in a scene based on two or more burst images corresponding to the scene captured by the first camera, the two or more burst images associated with the first exposure time; identify one or more portions of the scene associated with the at least one moving object if the at least one moving object is determined to be present in the scene; provide information related to the one or more portions of the scene to the second camera; receive an image of the scene captured by the second camera, wherein the pixel level shutter is programmed to periodically open and close, throughout a duration of said image capture, for pixels of the image sensor corresponding to the one or more portions of the scene; and generate a deblurred image corresponding to the scene based on the image.

In a fourth embodiment, there is provided a computer program product comprising at least one computer-readable storage medium, the computer-readable storage medium comprising a set of instructions, which, when executed by one or more processors, cause an apparatus to at least perform: determine presence of at least one moving object in a scene based on two or more burst images corresponding to the scene captured by a first camera, the two or more burst images associated with a first exposure time; identify one or more portions of the scene associated with the at least one moving object if the at least one moving object is determined to be present in the scene; provide information related to the one or more portions of the scene to a second camera, the second camera configured to capture single exposure images associated with a second exposure time, the second exposure time greater than the first exposure time; receive an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and generate a deblurred image corresponding to the scene based on the image.

In a fifth embodiment, there is provided an apparatus comprising: means for determining presence of at least one moving object in a scene based on two or more burst images corresponding to the scene captured by a first camera, the two or more burst images associated with a first exposure time; means for identifying one or more portions of the scene associated with the at least one moving object if the at least one moving object is determined to be present in the scene; means for providing information related to the one or more portions of the scene to a second camera, the second camera configured to capture single exposure images associated with a second exposure time, the second exposure time greater than the first exposure time; means for receiving an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and means for generating a deblurred image corresponding to the scene based on the image.

In a sixth embodiment, there is provided a computer program comprising program instructions which when executed by an apparatus, cause the apparatus to: determine presence of at least one moving object in a scene based on two or more burst images corresponding to the scene captured by a first camera, the two or more burst images associated with a first exposure time; identify one or more portions of the scene associated with the at least one moving object if the at least one moving object is determined to be present in the scene; provide information related to the one or more portions of the scene to a second camera, the second camera configured to capture single exposure images associated with a second exposure time, the second exposure time greater than the first exposure time; receive an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and generate a deblurred image corresponding to the scene based on the image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7B of the drawings.

Figure 1:
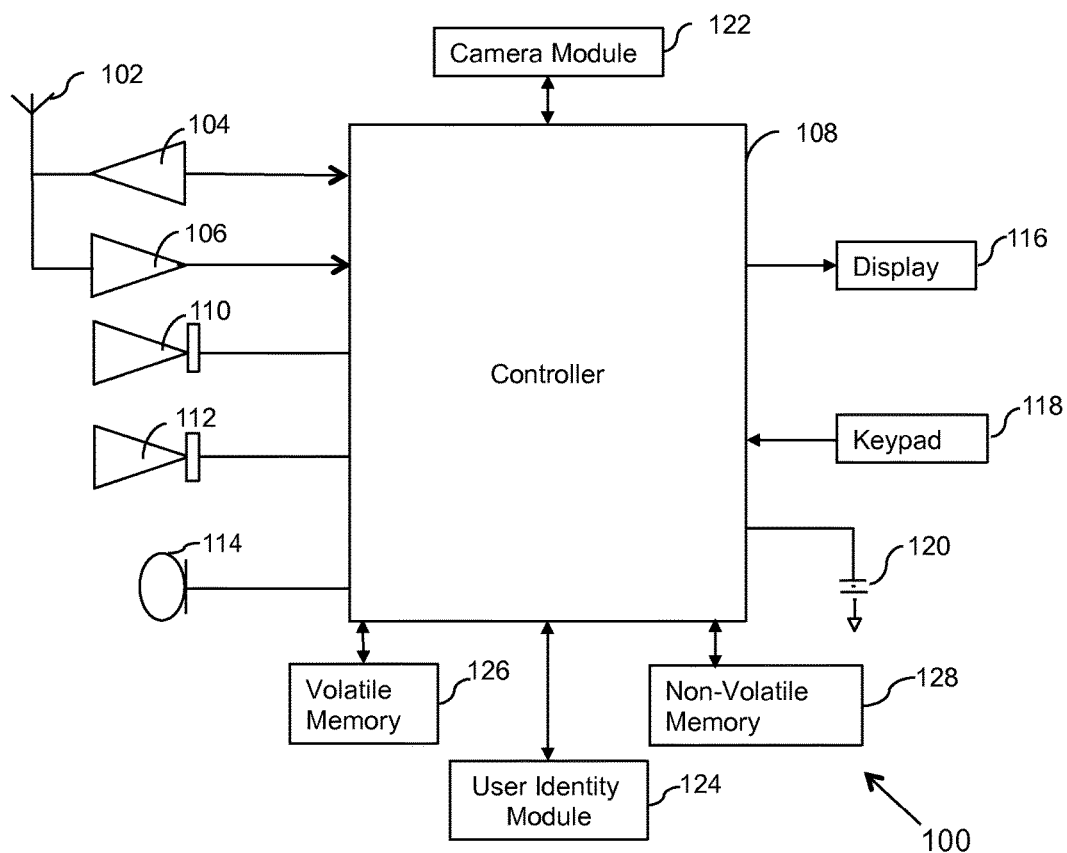
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; and wireline telecommunication networks such as public switched telephone network (PSTN) and the like.

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes at least one media capturing element, such as a camera, video and/or audio module, in communication with the controller 108. The media capturing element may be any means configured for capturing an image, video and/or audio for storage, display or transmission. In an example embodiment in which the media capturing element is a camera module 122, the camera module 122 may include at least one digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
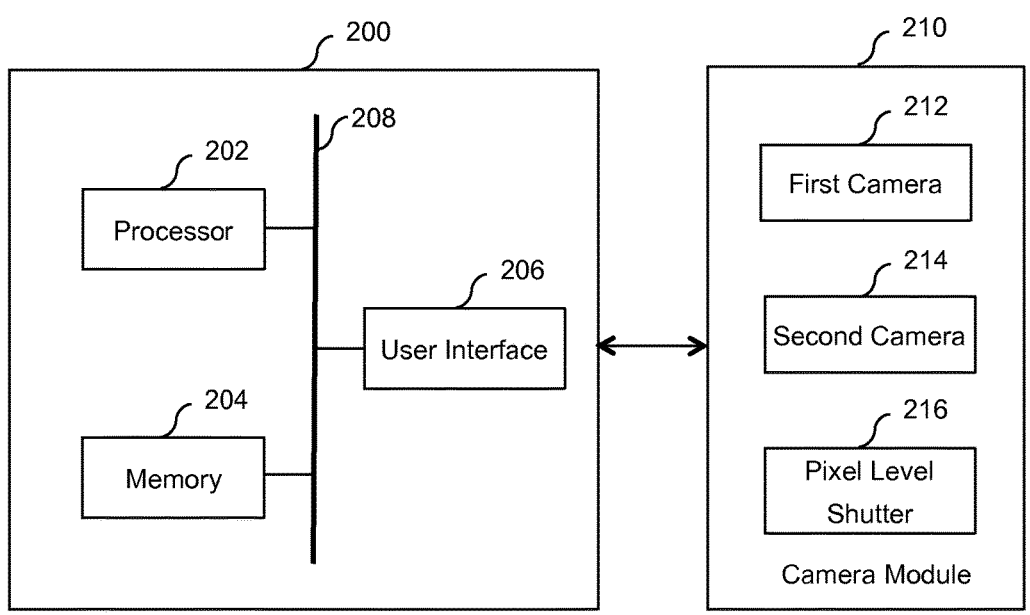
FIG. 2 illustrates an apparatus for motion deblurring of images, in accordance with an example embodiment.

FIG. 2 illustrates an apparatus 200 for motion deblurring of images, in accordance with an example embodiment. The term 'motion deblurring of images' as used herein refers to removal of motion blur from captured images. The motion blur is typically introduced on account of relative motion between an image capture element and an object being captured. The relative motion may be account of moving objects in a scene being captured by a steady camera or from an unsteady camera capturing a fairly still object. In some embodiments, the term 'motion deblurring' as used herein refers to removal of motion blur introduced on account of moving objects in a scene associated with low-light conditions and being captured by a camera with significantly large exposure time.

The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like.

The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal display, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing device, surveillance device and the like. Some examples of the electronic device may include a mobile phone, a personal digital assistant (PDA), surveillance camera and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of media content may include audio content, video content, data, and a combination thereof.

These components (202-206) may communicate with each other via a centralized circuit system 208 to generate motion deblurred images. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, main board, system board, or logic board. The centralized circuit system 208 may also, or alternatively, include other printed circuit assemblies (PCAs) or communication channel media.

In an embodiment, the apparatus 200 is in operative communication with a camera module 210. In an embodiment, the camera module 210 may be external to the apparatus 200, though it maybe included within the electronic device. In some embodiments, the camera module 210 may be disposed external to the electronic device and may be operatively coupled to the apparatus 200. The camera module 210 is configured to facilitate capturing of digital images and videos. To that effect, the camera module 210 includes a first camera 212 and a second camera 214. The first camera 212 is configured to capture low exposure burst images. Each burst image is associated with a first exposure time. The second camera 214 is configured to capture single exposure images with a second exposure time. The second exposure time is significantly greater than the first exposure time. In an illustrative example, if the second exposure time corresponds to 'T' seconds duration then a duration associated with the first exposure time may be around 'T/50' seconds. In another illustrative example, the second exposure time duration is 500 milliseconds and the first exposure time duration is 10 milliseconds. It is understood that numerical values for the second exposure time duration and the first exposure time duration are provided herein for illustration purposes and should not be considered to be limiting the scope of the present disclosure. Indeed, various such time duration values for the second exposure time and the first exposure time may be chosen for capturing images corresponding to the scenes.

The camera module 210 further includes a pixel level shutter 216, also commonly referred to as a 'flutter shutter'. The pixel level shutter 216 is a transmissive film (or a screen) disposed in front of an image sensor (such as for example, the image sensor of the second camera 214) and is programmed to periodically open and close, throughout the duration of the image capture, for selected pixels corresponding to the image sensor. For example, for a given pixel of the image sensor, the pixel level shutter 216 may open or close with respect to a following pattern: "1010000111000 0010100001100111101110101111001001100111", where '1' corresponds to an open configuration and '0' corresponding to a close configuration of the pixel level shutter 216. If the exposure time of the second camera 214 is chosen to be 52 milliseconds and since a length of the binary pattern provided above for opening and closing of the pixel level shutter 216 includes 52 binary values, a frequency of periodic opening and closing of the pixel level shutter 216 may be computed to be 1 millisecond. It is understood that numerical values/patterns for operation of pixel level shutter 216 are provided herein for example purposes and that various such patterns may be chosen for obtaining optimal deblurring of captured images.

The camera module 210 may further include other imaging circuitries and/or software, which in combination, may be an example of the camera module 122 of the device 100. In an embodiment, the dual camera configuration of the camera module 210 is arranged such that lens, image sensor and associated circuitry corresponding to the cameras are disposed along a common baseline to create a stereo camera setup. An example of such a setup is depicted in FIG. 3.

Figure 3:
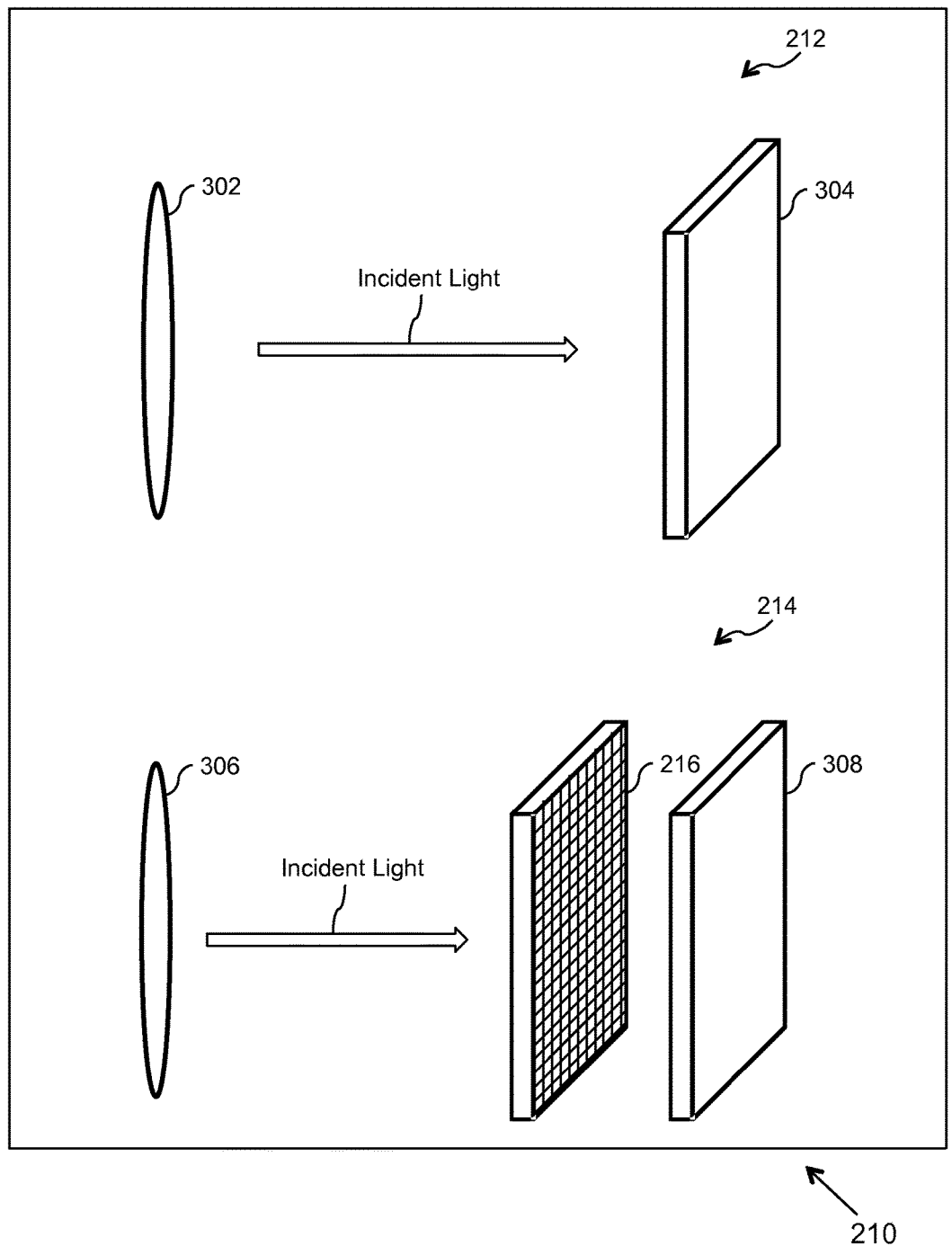
FIG. 3 depicts a simplified arrangement of components of a camera module, in accordance with an example embodiment.

Referring now to FIG. 3, a simplified arrangement of components of the camera module 210 is depicted, in accordance with an example embodiment. As explained above, the camera module 210 includes the first camera 212, the second camera 214 and the pixel level shutter 216. Each of the first camera 212 and the second camera 214 is depicted herein to include only a lens and an image sensor for illustration purposes. Accordingly, the first camera 212 is depicted to include a lens 302 and an image sensor 304, and, the second camera 214 is depicted to include a lens 306 and an image sensor 308. It is understood that the each camera may be associated with a plurality of components apart from the lens and the image sensor. Moreover it is understood that light incident on the lens is directed towards the image sensor as depicted in an example manner by "incident light" in FIG. 3. The pixel level shutter 216 is disposed in front of the image sensor 308 of the second camera 214 such that incident light on the lens 306 from a scene being captured travels through the pixel level shutter 216 before being sensed by the image sensor 308. The lens/image sensor circuitry of the first camera 212 and the second camera 214 are disposed along a common baseline (i.e. the lens and image sensors of the cameras are aligned with each other) such that the dual camera configuration of the camera module 210 configures a stereo camera setup. The stereo camera setup facilitates capturing of a same observed scene from two different angles, enabling depth computation, which assists in post processing of the captured images involving segmentation, object detection and tracking and the like. As explained above, the pixel level shutter 216 is programmed to periodically open and close for selected portions of the scene (or selected pixels), or more specifically, selectively allow or deny passage of light directed by the lens 306 towards the image sensor 308. The periodic opening and closing of the pixel level shutter 216 enables retention of high frequency content associated with moving objects in a scene being captured.

Referring back to FIG. 2, in an embodiment, the apparatus 200 is configured to receive burst images corresponding to a scene captured by the first camera 212 of the camera module 210. As explained above, each burst image is associated with the first exposure time (for example, a small exposure time). In an example embodiment, the processor 202 is configured to, with the content of the memory 204, and optionally with other components described herein, to cause the apparatus 200 to determine presence of at least one moving object in the scene based on two or more burst images corresponding to the scene captured by the first camera 212. In an embodiment, the scene is associated with low-light condition. In an embodiment, the determination of the presence of one or more moving objects is performed by computing motion correspondence information, for example motion vector information, which captures the transition between successive images on account of moving objects in a scene. In an embodiment, computing the motion correspondence information may include extracting features corresponding to objects in a burst image and matching the features across successive burst images. Examples of the features may include, but are not limited to, corners, edges of an image frame, or other region of interest such as background of the scene. In an example embodiment, the apparatus 200 may be caused to use algorithms such as scale-invariant feature transform (SIFT), Harris corner detector, smallest univalue segment assimilating nucleus (SUSAN) corner detector, features from accelerated segment test (FAST) for extracting features associated with the burst images. Alternatively, extracting the features may be performed by applying one of Discrete Cosine Transform (DCT), Discrete Sine Transform (DST), Karhunen-Loeve Transform (KLT) transform and a Hadamard transform on macroblocks corresponding to a burst image and the one or more successive burst images. In an example embodiment, the DCT is applied on macroblocks corresponding to a burst image and the one or more successive burst images and the DC components thus obtained may be treated as features. In an embodiment, the DC components may be obtained by partially decoding the burst image and the one or more successive burst images. In an embodiment, extracted features may be matched, for example, by using algorithms such as random sample consensus (RANSAC) to derive the object transition between burst images and thereby to compute the motion correspondence information. In an embodiment, the determination of the presence of moving objects in a scene is performed using known entropy and variance techniques. In an embodiment, the determination of the presence of moving objects in a scene is performed using optical flow techniques, which are not discussed herein for sake of brevity. In an example embodiment, a processing means may be configured to determine presence of at least one moving object in a scene based on two or more burst images corresponding to the scene captured by the first camera 212. An example of the processing means may include the processor 202, which may be an example of the controller 108.

In an example embodiment, the processor 202 is configured to, with the content of the memory 204, and optionally with other components described herein, to cause the apparatus 200 to identify one or more portions of the scene associated with the one or more moving objects, if the one or more moving objects are determined to be present in the scene. For example, if a presence of a moving object, such as a moving vehicle, is determined from the two or more burst images captured by the first camera 212, then a portion of the scene corresponding to the moving vehicle is identified. Similarly, some scenes may include multiple moving objects, for example individuals dancing on a stage, a flock of flying birds, fireworks in the sky and the like. The apparatus 200, in such scenarios, may identify multiple portions of the scene associated with moving objects using techniques such as motion correspondence, optical flow and the like. In an example embodiment, a processing means may be configured to identify one or more portions of the scene associated with the at least one moving object if the at least one moving object is determined to be present in the scene. An example of the processing means may include the processor 202, which may be an example of the controller 108.

In an example embodiment, the processor 202 is configured to, with the content of the memory 204, and optionally with other components described herein, to cause the apparatus 200 to provide information related to the one or more portions of the scene to the second camera 214. In an embodiment, the information related to the one or more portions of the scene includes information related to the pixels of the image sensor 304 of the first camera 212, which are associated with object motion. As the object moves, different sets of pixels may be associated with object motion. Accordingly, the information related to the one or more portions of the scene include information related to sets of pixels (or more specifically, locations of pixels on the image sensor 304) associated with object motion are provided to the second camera 214. In an embodiment, the information related to a portion of the scene includes a velocity estimate of a corresponding moving object. For example, if an object is associated with a set of pixels in a burst image and has moved to other sets of pixels in successive burst images, then a velocity estimate of the moving object may be determined based on the distance traveled in pixel locations within the burst exposure time(s), and such information may be passed onto the second camera 214. In an embodiment, the information related to the pixels associated with the one or more moving objects is provided substantially instantaneously to the second camera 214 subsequent to the capturing of the two or more burst images. In an embodiment, the apparatus 200 is caused to analyze successive burst images for determining presence of moving objects. The identification of presence of moving objects and corresponding determination of information related to the one or more portions of the scene associated with moving objects is performed on-the-fly and the information is provided to the second camera 214 in real-time with minimal delay. In an example embodiment, a processing means may be configured to provide information related to the pixels to the second camera 214. An example of the processing means may include the processor 202, which may be an example of the controller 108.

In an example embodiment, the processor 202 is configured to, with the content of the memory 204, and optionally with other components described herein, to cause the apparatus 200 to receive an image of the scene captured by the second camera 214. More specifically, the first camera 212 and the second camera 214 initiate capturing of the scene at the same time instant, however, upon dynamically receiving information related to the one or more portions of the scene, the second camera 214 provisions the information to the pixel level shutter 216, which is disposed in front of the image sensor 308 of the second camera 214 (as illustratively depicted in FIG. 3). The pixel level shutter 216 is programmed to periodically open and close, throughout the duration of the image capture, for pixels of the image sensor 308 corresponding to the one or more portions of the scene. The image captured in such a manner preserves high frequency content related to the moving objects.

In an example embodiment, the pixels of the image sensor 308 corresponding to the one or more portions of the scene are identified based on maximum permissible disparity between the first camera 212 and the second camera 214. More specifically, upon identification of the one or more portions of the scene associated with the one or more moving objects, information related to the one or more portions of the scene is provided to the second camera 214 and the pixel level shutter 216 so that the corresponding regions of the scene may be exposed to the operation of the pixel level shutter 216. A corresponding region of the scene for the second camera 214 for a moving object is a function of the baseline (or the distance) between the two cameras and the depth of the moving object. Since the depth of the moving object is unknown, the corresponding region for the second camera 214 is determined based on the maximum permissible disparity, which is a function of the baseline between the two cameras. For example, consider a scenario, whereby the scene being captured involves a rectangular moving object of width 'W' and height 'H' and the top-left co-ordinate of the rectangular moving object in a first image is at ($X_{first}$, $Y_{first}$). Further, the maximum permissible disparity between the two cameras is assumed to be 'D'. In such a scenario, the pixel level flutter shutter 216 is enabled over a rectangular region in the second image with top-left co-ordinate ($X_{first}$, $Y_{first}$) and width and height of the rectangular region being 'W+D' and 'H+D', respectively. The regions of operation of the pixel level shutter 216 is further explained with reference to example schematics in FIGS. 4A-4F illustrating images formed on the image sensor 308 by a moving object.

Figure 4A:
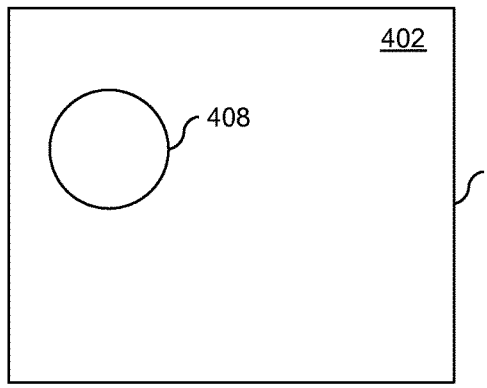
FIGS. 4A-4F depict example schematics for illustrating regions of operation of a pixel level shutter during image capture by a second camera, in accordance with an embodiment.
Figure 4B:
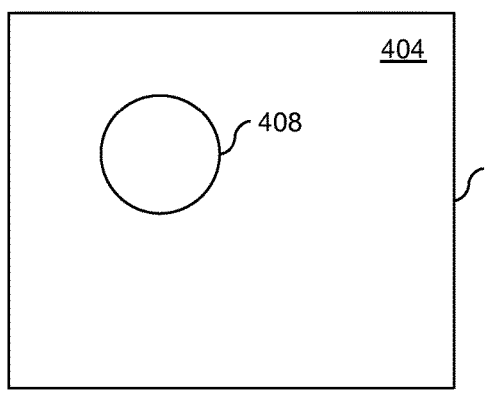
Figure 4C:
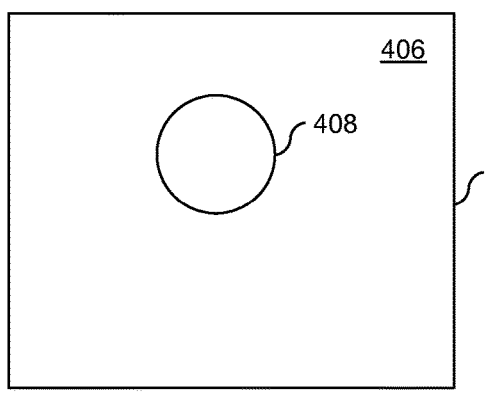
Figure 4D:
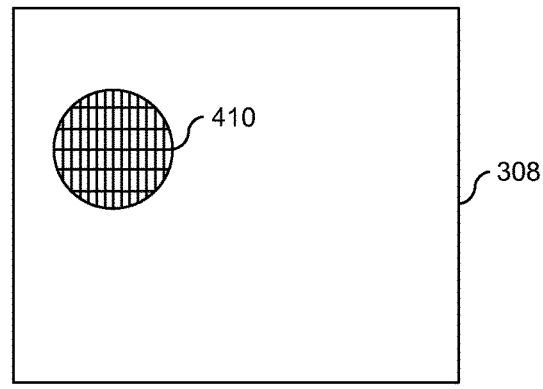
Figure 4E:
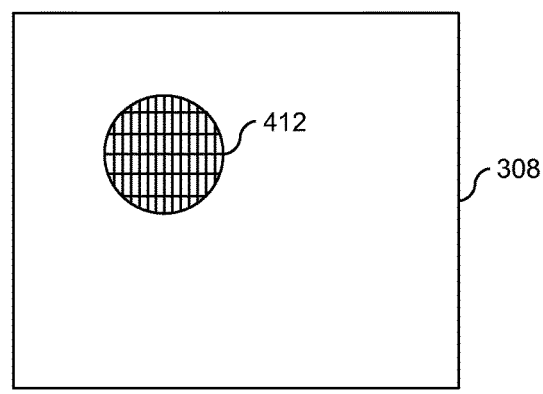
Figure 4F:
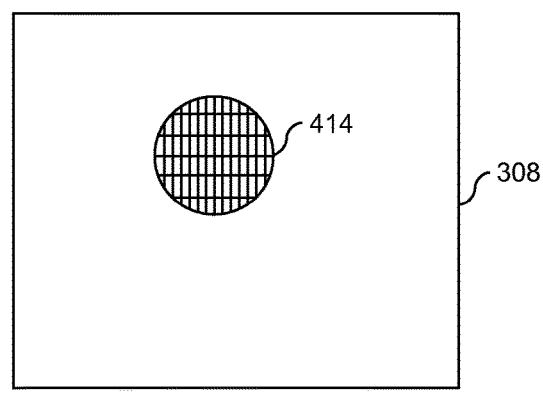

Referring now to FIGS. 4A-4F, example schematics are depicted for illustrating regions of operation of the pixel level shutter 216 during image capture by the second camera 214, in accordance with an embodiment. More specifically, FIGS. 4A, 4B and 4C depict images 402, 404 and 406 formed on the image sensor 308 of the second camera 214 by a rolling ball 408 at time instances, $t_1$, $t_2$ and $t_3$, respectively. As explained with reference to FIG. 2, the apparatus 200 is caused to determine presence of moving objects in successive burst images and upon determining presence of a moving object (i.e. the rolling ball 408) in the burst images, the apparatus 200 is further caused to identify portions of the scene associated with the moving object and provide the information to the second camera 214 and the pixel level shutter 216. Accordingly, the pixel level shutter 216 periodically opens and closes, throughout the duration of image capture by the second camera 214, for pixels of the image sensor 308 corresponding to the portions of the scene associated with the rolling ball 408. It is understood that the pixel level shutter 216 may utilize information related to the one or more portions of the scene, such as location of pixels, velocity estimate of the moving objects and the like to select regions of operation based on the maximum permissible disparity as explained above. Accordingly, the pixel level shutter 216 may periodically open and close for pixels of the image sensor 308 corresponding to the portions of the scene associated with the rolling ball 408 at time instances $t_1$, $t_2$ and $t_3$, respectively. FIGS. 4D, 4E and 4F depict regions of operation of the pixel level shutter 216 (i.e. portions of the scene corresponding to rolling ball 408) as depicted by regions 410, 412 and 414, at time instances $t_1$, $t_2$ and $t_3$, respectively. As explained above, the image captured in such a manner preserves high frequency content related to the moving objects.

Referring now to FIG. 2, in an embodiment, the apparatus 200 is caused to determine if a moving object, identified to be present in the scene, is associated with a homogenous surface. Various known techniques may be employed for determining if an object in a scene being captured is associated with a homogenous surface. For example, if no texture variations are observed for an object upon comparison of successive burst images, then such an object is determined to be associated with a homogenous surface. For example, a ball may be determined as an object associated with a homogenous surface. However, moving objects, such as vehicles, individuals and the like may be determined to be objects with non-homogenous surface. In an embodiment, the apparatus 200 is further caused to provide such information to the pixel level shutter 216, which is programmed to periodically open and close, throughout the duration of the image capture by the second camera 214, for pixels of the image sensor 308 associated with edges of the a portion of the scene corresponding to the moving object associated with a homogenous surface. For example, if the moving object is a ball, which has a substantially homogenous surface, then the pixel level shutter 216 may be programmed to open and close for pixels associated with the circular edge of the ball. Such an approach captures high frequency content associated with object edges, which aids in deblurring of objects. Since an object is associated with homogenous surface, deblurring of the object along its edges may suffice (as a blurring distortion of details within the object associated with homogenous surface) may not significantly degrade a quality of the captured image.

In an example embodiment, the processor 202 is configured to, with the content of the memory 204, and optionally with other components described herein, to cause the apparatus 200 to generate a deblurred image corresponding to the scene based on the image captured by the second camera 214. In an embodiment, the apparatus 200 is caused to perform deconvolution of the image to remove motion blur caused by the one or moving objects in the scene. As explained above, a relative motion between an imaging system (for example the first camera 212 or the second camera 214), and the object being captured introduces a blurring effect, which distorts the details in the captured image. In an example embodiment, the optical path traveled by the light ray (corresponding to the image being captured) may be considered to be optically perfect and convolved with a point-spread function (PSF) to produce the captured image. The PSF is a mathematical function that describes the output of an imaging system for an input point source. More specifically, the PSF describes a distortion that a theoretical point source of light experiences on account of traveling along the optical path in the imaging system. In an example embodiment, blind deconvolution methods may be utilized to estimate the PSF from a blurred image and use the PSF to deconvolve the image. These methods include well-known algorithms such as Richardson Lucy and Wiener deconvolution.

The Richardson-Lucy algorithm is an iterative deconvolution algorithm derived from Bayes theorem that minimizes the following estimation error:

$$\arg\min_I n(\|I_b - I \otimes K\|^2)$$

where I is the deblurred image, K is the blur function, $I_b$ is the observed blur image, and n(.) is the noise distribution. A solution can be obtained using an iterative update algorithm defined as follows:

$$I^{t+1} = I^t \times K * \frac{I_b}{I^t \otimes K}$$

where * is the correlation operation. A blind deconvolution algorithm using the Richardson-Lucy algorithm iteratively optimizes I and K in alternation.

In an example embodiment, a least-square estimation may be utilized to obtain the deblurred image as follows:

$$A = X^{-1}B$$

Where B is the observed image, A is the deblurred image and X is the blur function. A pseudo-inverse $X^{-1}$ of the estimated blur function X may be computed in the least squares sense and may be used to obtain the deblurred image.

In an example embodiment, a processing means may be configured to perform motion deblurring by performing deconvolution of the captured image. An example of the processing means may include the processor 202, which may be an example of the controller 108.

In an embodiment, the periodic opening and closing of the pixel level shutter 216 in front of the image sensor 308, throughout the duration of the image capture, for pixels corresponding to the one or more portions of the scene is performed to preserve high frequency content corresponding to the moving object(s) of the scene. The preserved high frequency content is configured to facilitate in the deconvolution of the image for removal of the motion blur. More specifically, deconvolving of a blurred image without the high frequency content may generate undesirable ringing artifacts in the deblurred image. Accordingly, the preserved high frequency content assists in efficiently removing the motion blur from the captured image. In an embodiment, the removal of the motion blur from the image generates the deblurred image. In an example embodiment, a processing means may be configured to generate a deblurred image corresponding to the scene based on the image. An example of the processing means may include the processor 202, which may be an example of the controller 108.

In an example embodiment, the processor 202 is configured to, with the content of the memory 204, and optionally with other components described herein, to cause the apparatus 200 to perform normalization of one or more pixel regions in the deblurred image corresponding to the pixels of the image sensor 308 exposed to the periodic opening and closing of the pixel level shutter 216 during image capture. More specifically, as explained with reference to FIGS. 4A-4F, pixels corresponding to one or more portions of the scene (i.e. pixel regions) in the captured image were subjected to the periodic opening and closing of the pixel level shutter 216. Such a captured image is deconvolved to generate the deblurred image. The one or more pixel regions in the deblurred image are then normalized to generate the final image corresponding to the scene. In an embodiment, normalization of the one or more pixel regions implies performing compensation for reduced light received by the one or more pixel regions on account of exposure to the periodic opening and closing of the pixel level shutter 216. Such compensation for reduced light received may involve increasing a gain factor for corresponding pixel regions. For example, if a pixel region is associated with 50% light reduction, then the gain factor for this region (or more specifically, for each pixel in this region) is increased by a multiple of two to normalize the corresponding pixel region. In an example embodiment, a processing means may be configured to perform normalization of one or more pixel regions in the deblurred image corresponding to the pixels of the image sensor 308 exposed to the periodic opening and closing of the pixel level shutter 216 during image capture. An example of the processing means may include the processor 202, which may be an example of the controller 108.

In an example embodiment, the processor 202 is configured to, with the content of the memory 204, and optionally with other components described herein, to cause the apparatus 200 to receive a plurality of burst images corresponding to the scene captured within a time period equal to the second exposure time by the first camera 212. For example, if the second exposure time is T seconds, then the first camera 212 may continue capturing low exposure burst images (for example at T/50 seconds) till the duration of T seconds is completed. The plurality of burst images, so received, also includes the two or more burst images utilized for determining presence of moving objects in the scene. In an embodiment, the apparatus 200 is caused to generate a secondary image corresponding to the scene based on the plurality of burst images by utilizing one or more deghosting algorithms. More specifically, the plurality of burst images may constitute a stack of burst images wherein objects may have moved by some distance. The deghosting algorithms may extract objects from the original image and superimpose over one or more images to facilitate generation of the secondary image. In an illustrative example, pixels in the burst images that contain motion are detected (for example, as explained above) and the burst images are then fused while taking into account only the pixels from the least saturated burst image in the detected ghost areas. Such a deghosting operation removes ghosting artifacts from the generated secondary image. In another illustrative example, low dynamic range (LDR) images are aligned to a reference image before combining them into a high dynamic range (HDR) image (i.e. the secondary image). In an embodiment, homography-based approach is used for image alignment. In some example embodiments, optical flow algorithms are utilized for aligning differently exposed burst images before combining them into the secondary image.

The secondary image and the final image obtained from the first camera 212 and the second camera 214, respectively, configure two images for the same scene captured using a stereo camera setup. In an embodiment, depth information corresponding to the scene is computed using known techniques based on the final image and the secondary image. Further, in some embodiments, three-dimensional (3D) reconstruction of one or more objects in the scene may be performed based on the computed depth information. More specifically, the 3D reconstruction may be performed for both moving objects (for example, moving vehicles, people, birds and the like) and non-moving objects (for example, buildings, natural landscape, still people and the like) of the scene. Furthermore, post-processing techniques, such as those related to segmentation, object detection and tracking and the like, may also be implemented upon computation of depth information and/or 3D reconstruction of the scene.

In an example embodiment, the processor 202 is configured to, with the content of the memory 204, and optionally with other components described herein, to cause the apparatus 200 to provide indication of the absence of the at least one moving object in the scene to the second camera 214. As explained above, the apparatus 200 is caused to determine presence of one or more moving objects in the scene based on two or more burst images corresponding to the scene captured by the first camera 212. One or more techniques, such as motion correspondence information, optical flow and the like may be utilized to determine the presence of one or more moving objects in the scene. In an embodiment, the apparatus 200 may be caused to determine an absence of a moving object in the scene. In such a scenario, the apparatus 200 is caused to provide an indication of the absence of the at least one moving object in the scene to the second camera 214 and the pixel level shutter 216. In an embodiment, such an indication of the absence of at least one moving object in the scene may be provided to the second camera 214 and the pixel level shutter 216 substantially instantaneously. Upon receiving the indication, the pixel level shutter 216 is programmed to stay open, throughout the duration of the image capture by the second camera 214, for all pixels of the image sensor 308 of the second camera 214. A deblurring/deconvolution and/or normalization operations may be precluded on the captured image, which may then configure the final image corresponding to the scene. A secondary image may be obtained from the plurality of burst images captured by the first camera 212 as explained above, and, moreover, depth information and/or 3D reconstruction corresponding to the scene may be performed as explained above.

Figure 5:
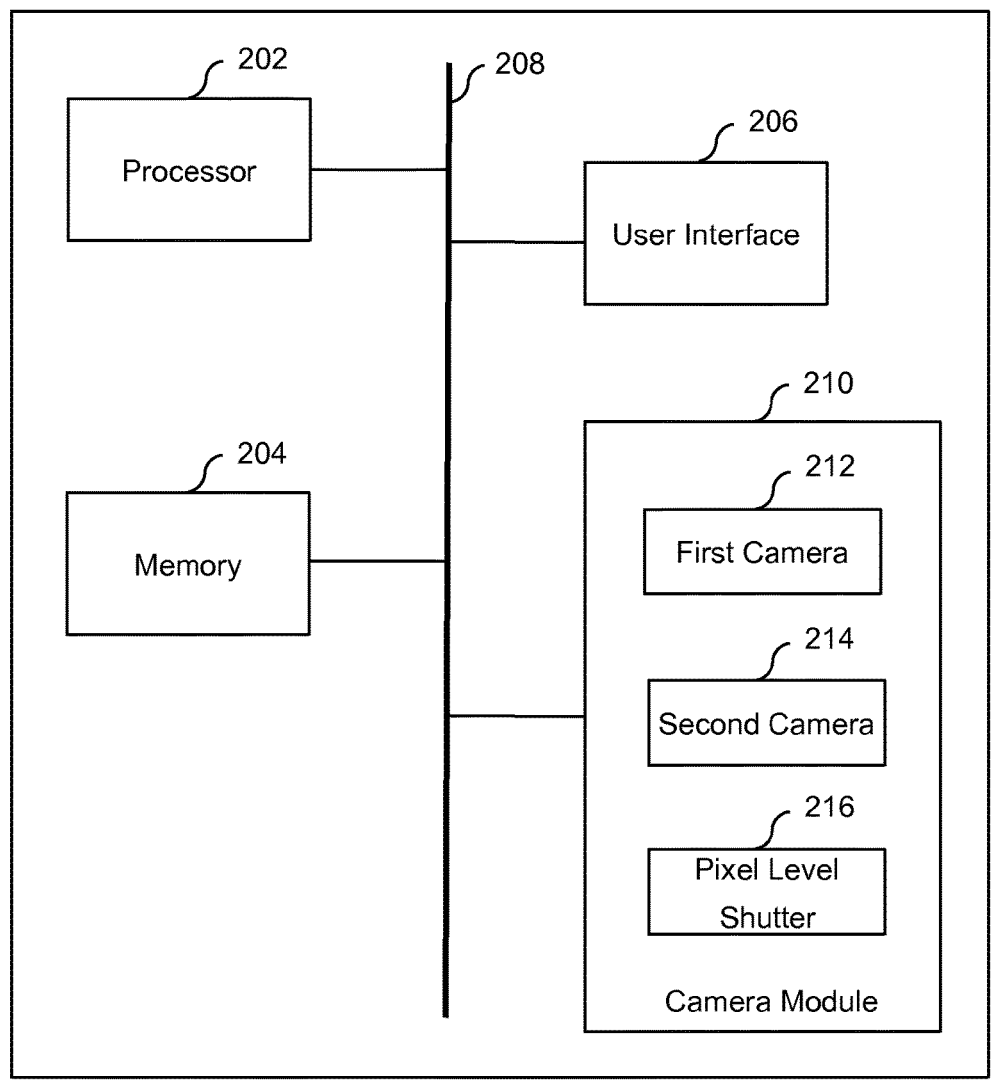
FIG. 5 illustrates an apparatus for motion deblurring of images, in accordance with another example embodiment.

It should be noted that though the apparatus 200 is caused to be in operative communication with the camera module 210 including the first camera 212, the second camera 214 and the pixel level shutter 216 in FIG. 2, in some embodiments, the camera module 210 may be configured to be included in the apparatus 200. Such an apparatus for motion deblurring of images is shown in FIG. 5. The apparatus 500 of FIG. 5 is depicted to include the first camera 212, the second camera 214 and the pixel level shutter 216 of the camera module 210 in addition to the processor 202, memory 204, the user interface 206 and the centralized circuit system 208. The various components of the apparatus 500 of FIG. 5, such as the processor 202, the memory 204, the user interface 206, the centralized circuit system 208, the first camera 212, the second camera 214 and the pixel level shutter 216 perform similar functions as explained in FIG. 2 and are not explained herein. More specifically, the determination of presence of one or more moving objects in a scene based on two or more burst images captured by the first camera 212, the identification of one or more portions of the scene corresponding to the one or more moving objects, the provision of information related to the one or more portions of the scene to the second camera 214, the reception of the image captured by the second camera 214 while the pixel level shutter 216 periodically opens and closes, throughout the duration of image capture for pixels of the image sensor 308 corresponding to the one or more portions of the scene and the generation of the deblurred image from the captured image may be performed in a similar manner as explained in FIG. 2.

Figure 6:
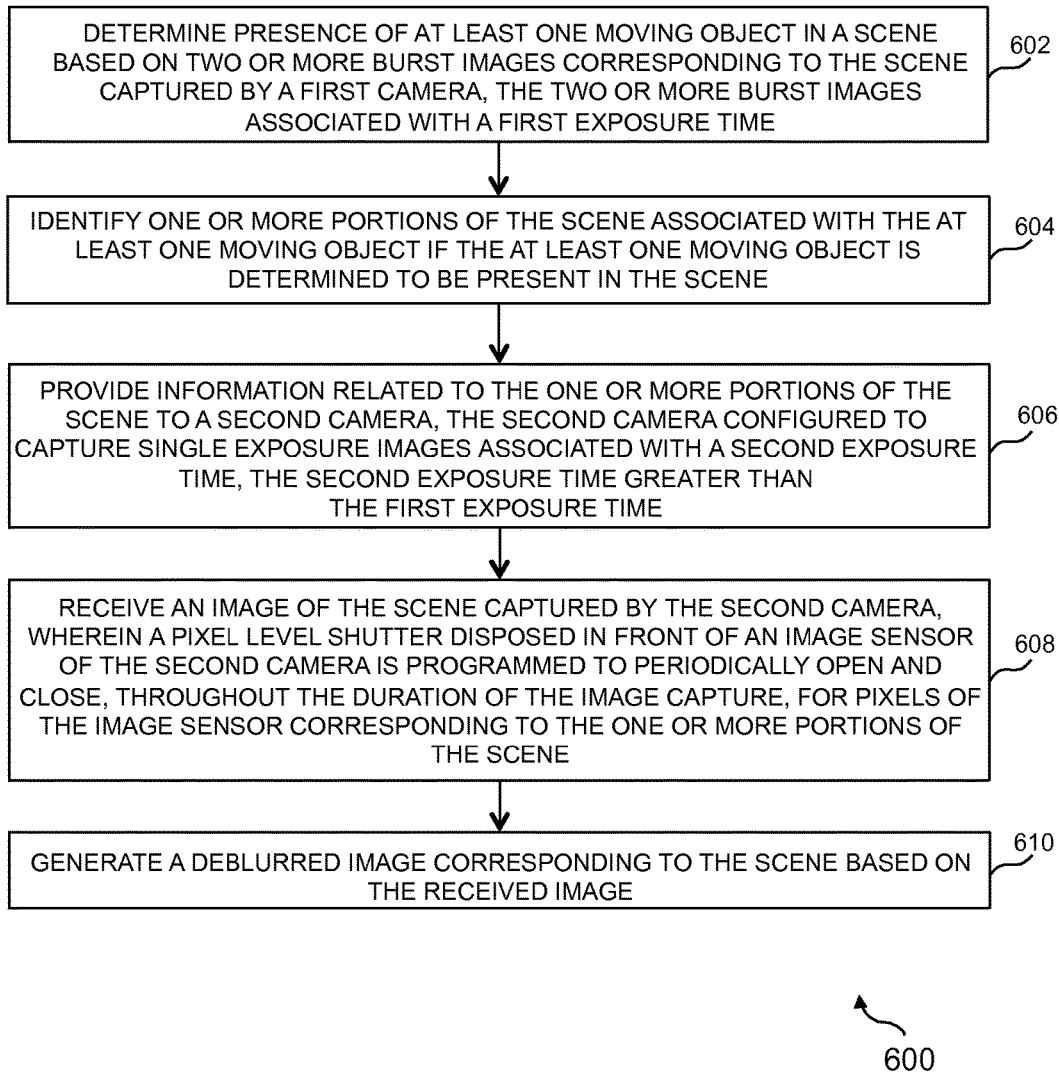
FIG. 6 is a flowchart depicting an example method for motion deblurring of images, in accordance with an example embodiment.

FIG. 6 is a flowchart depicting an example method 600 for motion deblurring of images, in accordance with an example embodiment. The method 600 depicted in the flow chart may be executed by, for example, the apparatus 200 of FIG. 2.

At 602, the method 600 includes determining presence of at least one moving object in a scene based on two or more burst images corresponding to the scene captured by a first camera (for example, the first camera 212). In an embodiment, the scene is associated with low-light condition. In an embodiment, the determination of the presence of one or more moving objects is performed by computing motion correspondence information, for example motion vector information, which captures the transition between successive images on account of moving objects in a scene. In an embodiment, computing the motion correspondence information may include extracting features corresponding to objects in a burst image and matching the features across successive burst images. In an embodiment, the determination of the presence of moving objects in a scene is performed using optical flow techniques, which are not discussed herein for sake of brevity.

At 604, one or more portions of the scene associated with the at least one moving object are identified, if the at least one moving object is determined to be present in the scene. For example, if a presence of a moving object, such as a moving vehicle, is determined from the two or more burst images captured by the first camera, then a portion of the scene corresponding to the moving vehicle is identified. Similarly, some scenes may include multiple moving objects, for example individuals dancing on a stage, a flock of flying birds, fireworks in a sky and the like. In such scenarios, multiple portions of the scene associated with moving objects may be identified using techniques such as motion correspondence, optical flow and the like.

At 606, information related to the one or more portions of the scene is provisioned to a second camera. In an embodiment, the information related to the one or more portions of the scene includes information related to the pixels of an image sensor of the first camera, which are associated with object motion. As the object moves, different sets of pixels may be associated with object motion. Accordingly, the information related to the one or more portions of the scene include information related to sets of pixels (or more specifically, locations of pixels on the image sensor) associated with object motion are provided to the second camera. In an embodiment, the information related to a portion of the scene includes a velocity estimate of a corresponding moving object. For example, if an object is associated with a set of pixels in a burst image and has moved to other sets of pixels in successive burst images, then a velocity estimate of the moving object may be determined based on the distance traveled in pixel locations within the burst exposure time(s), and such information may be passed onto the second camera. In an embodiment, the information related to the pixels associated with the one or more moving objects is provided substantially instantaneously to the second camera subsequent to the capturing of the two or more burst images. In an embodiment, successive burst images are analyzed for determining presence of moving objects. The identification of presence of moving objects and corresponding determination of information related to the one or more portions of the scene associated with moving objects is performed on-the-fly and the information is provided to the second camera in real-time with minimal delay.

At 608, an image of the scene captured by the second camera is received. More specifically, the first camera and the second camera initiate capturing of the scene at the same time instant, however, upon dynamically receiving information related to the one or more portions of the scene, the second camera provisions the information to the pixel level shutter, which is disposed in front of the image sensor of the second camera (as illustratively depicted in FIG. 3). The pixel level shutter of the second camera is programmed to periodically open and close, throughout the duration of the image capture, for pixels of the image sensor corresponding to the one or more portions of the scene. In an example embodiment, the pixels of the image sensor corresponding to the one or more portions of the scene are identified based on maximum permissible disparity between the first camera and the second camera. More specifically, upon identification of the one or more portions of the scene associated with the one or more moving objects, information related to the one or more portions of the scene is provided to the second camera and the pixel level shutter so that the corresponding regions of the scene may be exposed to the operation of the pixel level shutter. A corresponding region of the scene for the second camera for a moving object is a function of the baseline (or the distance) between the two cameras and the depth of the moving object. Since the depth of the moving object is unknown, the corresponding region for the second camera is determined based on the maximum permissible disparity, which is a function of the baseline between the two cameras.

The determination of the corresponding region for enabling the operation of the pixel level shutter may be performed as explained with reference to FIGS. 4A-4F. In an embodiment, if a moving object, identified to present in the scene, is associated with a homogenous surface then such information is provided to the pixel level shutter, which is programmed to periodically open and close, throughout the duration of the image captured by the second camera, for pixels of the image sensor associated with edges of a portion of the scene corresponding to the moving object associated with a homogenous surface. For example, if the moving object is a ball, which has a substantially homogenous surface, then the pixel level shutter may be programmed to periodically open and close for pixels associated with the circular edge of the ball. Such an approach captures high frequency content associated with object edges, which aids in deblurring of objects. Since an object is associated with homogenous surface, deblurring of the object along its edges may suffice (as a blurring distortion of details within the object associated with homogenous surface) may not significantly degrade a quality of the captured image.

At 610, a deblurred image corresponding to the scene is generated based on the image captured by the second camera. In an embodiment, a deconvolution of the image is performed to remove motion blur caused by the one or moving objects in the scene. In an example embodiment, blind deconvolution methods may be utilized to estimate the PSF from a blurred image and use the PSF to deconvolve the image. These methods include well-known algorithms such as Richardson Lucy and Wiener deconvolution. The deconvolution of the image may be performed as explained with reference to FIG. 2 and is not explained again herein.

In an embodiment, the periodic opening and closing of the pixel level shutter in front of the image sensor, throughout the duration of the image capture, for pixels corresponding to the one or more portions of the scene is performed to preserve high frequency content corresponding to the moving object(s) of the scene. The preserved high frequency content is configured to facilitate in the deconvolution of the image for removal of the motion blur. More specifically, deconvolving of a blurred image without the high frequency content may generate undesirable ringing artifacts in the deblurred image. Accordingly, the preserved high frequency content assists in efficiently removing the motion blur from the captured image. In an embodiment, the removal of the motion blur from the image generates the deblurred image.

In an embodiment, a normalization of one or more pixel regions in the deblurred image corresponding to the pixels of the image sensor exposed to the periodic opening and closing of the pixel level shutter during image capture is performed. The normalization of the one or more pixel regions may be performed as explained with reference to FIG. 2 and is not explained herein. The one or more pixel regions in the deblurred image are then normalized to generate a final image corresponding to the scene.

In an example embodiment, a plurality of burst images corresponding to the scene captured within a time period equal to the second exposure time by the first camera is received. For example, if the second exposure time is T seconds, then the first camera may continue capturing low exposure burst images (for example at T/50 seconds) till the duration of T seconds is completed. The plurality of burst images, so received, also includes the two or more burst images utilized for determining presence of moving objects in the scene. In an embodiment, a secondary image corresponding to the scene based on the plurality of burst images is generated by utilizing one or more deghosting algorithms. The generation of the secondary image using deghosting algorithms may be performed as explained with reference to FIG. 2 and is not explained herein. The secondary image and the final image obtained from the first camera and the second camera, respectively, configure two images for the same scene captured using a stereo camera setup. In an embodiment, depth information corresponding to the scene is computed using known techniques based on the final image and the secondary image. Further, in some embodiments, three-dimensional (3D) reconstruction of one or more objects (including moving and non-moving objects) in the scene may be performed based on the computed depth information. Furthermore, post-processing techniques, such as those related to segmentation, object detection and tracking and the like, may also be implemented upon computation of depth information and/or 3D reconstruction of the scene.

In an example embodiment, an indication of the absence of the at least one moving object in the scene is provided to the second camera. As explained above, the presence of one or more moving objects in the scene are determined based on two or more burst images corresponding to the scene captured by the first camera. One or more techniques, such as motion correspondence information, optical flow and the like may be utilized to determine the presence of one or more moving objects in the scene. In an embodiment, an absence of a moving object in the scene is determined. In such a scenario, an indication of the absence of at least one moving object in the scene is provided to the second camera and from the second camera to the pixel level shutter. In an embodiment, such an indication of the absence of at least one moving object in the scene may be provided to the second camera and the pixel level shutter substantially instantaneously. Upon receiving the indication, the pixel level shutter is programmed to stay open, throughout the duration of the image capture, for all pixels of the image sensor of the second camera. A deblurring/deconvolution and/or normalization operations may be precluded on the captured image, which may then configure the final image corresponding to the scene. A secondary image may be obtained from the plurality of burst images captured by the first camera as explained above, and, moreover, depth information and/or 3D reconstruction corresponding to the scene may be performed as explained above.

Figure 7A:
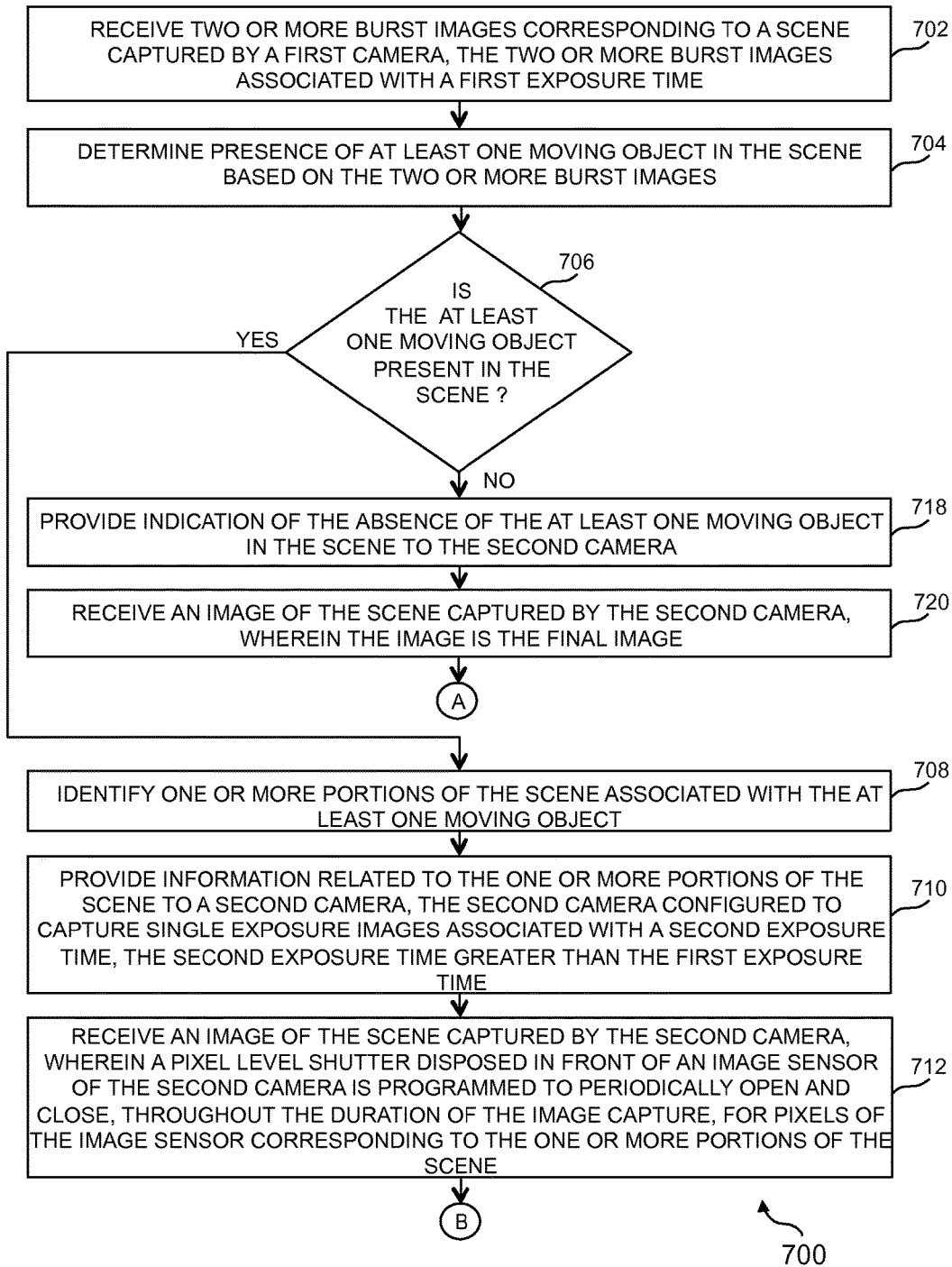
FIGS. 7A-7B are a flowchart depicting an example method for motion deblurring of images, in accordance with another example embodiment.
Figure 7B:
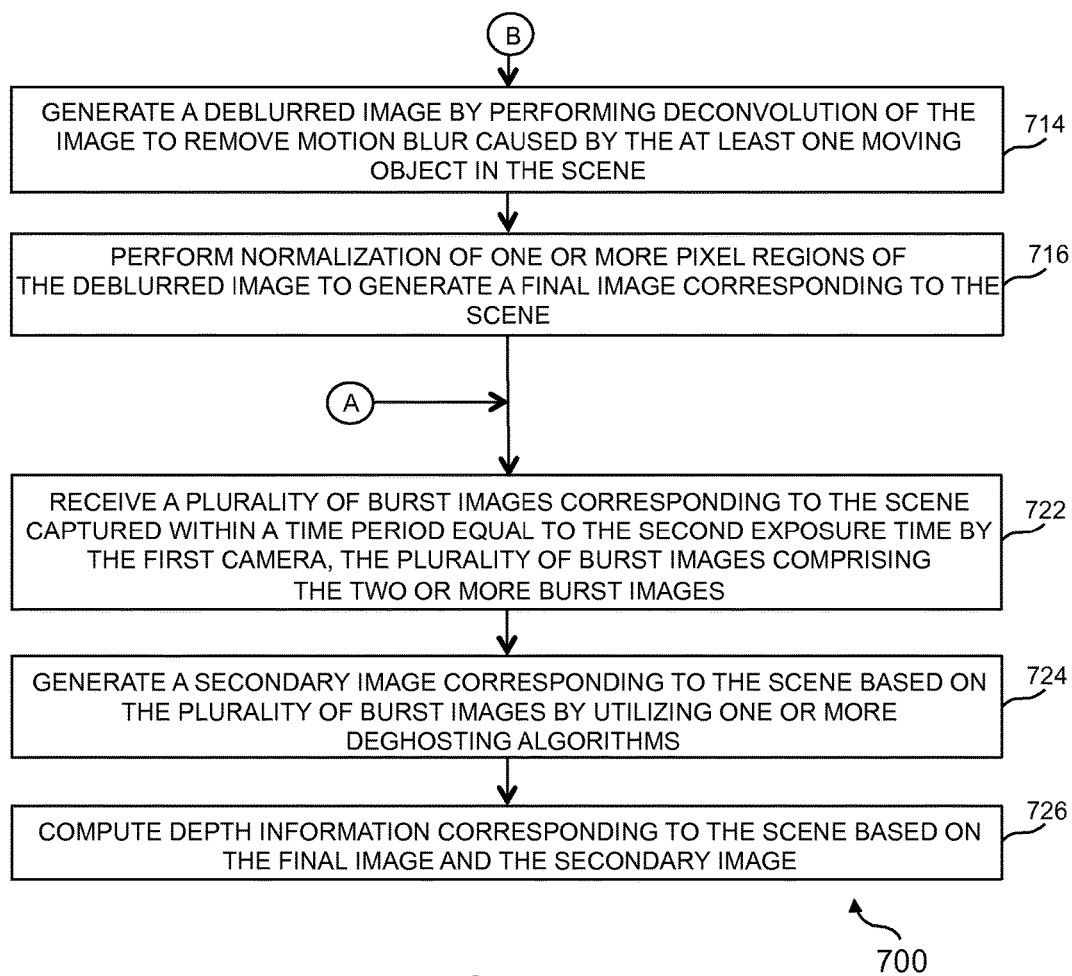

FIGS. 7A and 7B are a flowchart depicting an example method 700 for motion deblurring of images, in accordance with another example embodiment. The method 700 depicted in the flow chart may be executed by, for example, the apparatus 200 of FIG. 2.

At 702, the method 700 includes receiving two or more burst images corresponding to a scene captured by a first camera. The first camera is configured to capture low exposure burst images. In an embodiment, the scene is associated with low-light condition. At 704, a presence of at least one moving object in the scene is determined based on the two or more burst images. The determination of the presence of at least one moving object may be performed as explained in conjunction with 602 of the method 600 and is not explained herein. At 706, it is checked if the at least one moving object is present in the scene or not. If the presence of at least one moving object is determined at 706, then 708 is performed. At 708, one or more portions of the scene associated with the at least one moving object are identified. For example, if a presence of a moving object, such as a moving vehicle, is determined from the two or more burst images captured by the first camera, then a portion of the scene corresponding to the moving vehicle is identified. At 710, information related to the one or more portions of the scene is provisioned to a second camera. The provisioning of the information related to the one or more portions of the scene to the second camera may be performed as explained in conjunction with 606 of the method 600 and is not explained again herein. The identification of presence of moving objects and corresponding determination of information related to the one or more portions of the scene associated with moving objects is performed on-the-fly and the information is provided to the second camera in real-time with minimal delay.

At 712, an image of the scene captured by the second camera is received. More specifically, the first camera and the second camera initiate capturing of the scene at the same time instant, however, upon dynamically receiving information related to the one or more portions of the scene, the second camera provisions the information to the pixel level shutter, which is disposed in front of an image sensor of the second camera (as illustratively depicted in FIG. 3). The pixel level shutter of the second camera is programmed to periodically open and close, throughout the duration of the image capture, for pixels of the image sensor corresponding to the one or more portions of the scene. The image captured in such a manner retains high frequency content related to the moving objects as explained with reference to FIGS. 4A-4F. In an embodiment, if a moving object, identified to present in the scene, is associated with a homogenous surface then such information is provided to the pixel level shutter, which is programmed to periodically open and close, throughout the duration of the image capture by the second camera, for pixels of the image sensor associated with edges of a portion of the scene corresponding to the moving object associated with a homogenous surface. For example, if the moving object is a ball, which has a substantially homogenous surface, then the pixel level shutter may be programmed to periodically open and close for pixels associated with the circular edge of the ball. Such an approach captures high frequency content associated with object edges, which aids in deblurring of objects. Since an object is associated with homogenous surface, deblurring of the object along its edges may suffice (as a blurring distortion of details within the object associated with homogenous surface) may not significantly degrade a quality of the captured image.

At 714, a deblurred image corresponding to the scene is generated by performing deconvolution of the image captured by the second camera to remove motion blur caused by the one or more moving objects in the scene. In an example embodiment, blind deconvolution methods may be utilized to estimate the PSF from a blurred image and use the PSF to deconvolve the image. These methods include well-known algorithms such as Richardson Lucy and Wiener deconvolution. The deconvolution of the image may be performed as explained with reference to FIG. 2 and is not explained again herein. At 716, a final image corresponding to the scene is generated by performing normalization of one or more pixel regions in the deblurred image corresponding to the pixels of the image sensor exposed to the periodic opening and closing of the pixel level shutter during image capture. The performing of the normalization may be performed as explained with reference to method 600 and is not explained again herein.

If an absence of at least one moving object is determined at 706, then 718 is performed. At 718, an indication of the absence of the at least one moving object in the scene is provided to the second camera. In such a scenario, an indication of the absence of at least one moving object in the scene is provided to the second camera and from the second camera to the pixel level shutter. In an embodiment, such an indication of the absence of at least one moving object in the scene may be provided to the second camera and the pixel level shutter substantially instantaneously. Upon receiving the indication, the pixel level shutter is programmed to stay open, throughout the duration of the image capture. At 720, an image corresponding to the scene captured by the second camera is received and treated as the final image.

At 722, a plurality of burst images corresponding to the scene captured within a time period equal to the second exposure time by the first camera is received. For example, if the second exposure time is T seconds, then the first camera may continue capturing low exposure burst images (for example at T/50 seconds) till the duration of T seconds is completed. The plurality of burst images, so received, also includes the two or more burst images utilized for determining presence of moving objects in the scene. At 724, a secondary image corresponding to the scene based on the plurality of burst images is generated by utilizing one or more deghosting algorithms. At 726, depth information corresponding to the scene is computed using known techniques based on the final image and the secondary image.

It should be noted that to facilitate discussions of the flowcharts of FIGS. 6 to 7A-7B, certain operations are described herein as constituting distinct steps performed in a certain order. Such implementations are examples only and non-limiting in scope. Certain operations may be grouped together and performed in a single operation, and certain operations may be performed in an order that differs from the order employed in the examples set forth herein. Moreover, certain operations of the methods 600 and 700 are performed in an automated fashion. These operations involve substantially no interaction with the user. Other operations of the methods 600 and 700 may be performed in a manual fashion or semi-automatic fashion. These operations involve interaction with the user via one or more user interface presentations.

The operations of the flowcharts, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture, the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to generate motion deblurred images. Various embodiments disclose use of a dual camera setup with a pixel level shutter enabled for only selective regions where there is object motion. The proposed approach is configured to handle single still images using a dual camera setup, with one image being properly exposed to the scene with selective motion regions being exposed to the pixel level shutter operation. Such implementation of the pixel level shutter enables preservation of high frequency content of the objects in the scene, which results in better output after deconvolution. Moreover, selective pixel level shutter operation over portions where object is moving results in getting higher exposure for other areas of the scene whereas in conventional mechanisms such an operation is performed at an aperture level which reduces overall exposure time by 50% resulting in loss of light throughout. Embodiments disclosed herein enable generation of high quality images precluding motion blur even in low light conditions when the exposure time of the camera is kept significantly large to accommodate more light inside the camera. Techniques disclosed herein may particularly be useful to imaging applications in fields related to surveillance, security, traffic monitoring, nature photography and the like.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A non-transitory computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various embodiments are set out in the independent claims, other embodiments comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
   determining presence of at least one moving object in a scene based on two or more burst images corresponding to the scene captured by a first camera, the two or more burst images are associated with a first exposure time;
   identifying one or more portions of the scene associated with the at least one moving object if the at least one moving object is determined to be present in the scene;
   providing information related to the one or more portions of the scene to a second camera, the second camera configured to capture single exposure images associated with a second exposure time, the second exposure time being greater than the first exposure time, wherein the information related to the one or more portions of the scene associated with the at least one moving object is provided substantially instantaneously to the second camera subsequent to the capturing of the two or more burst images;
   receiving an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and
   generating a deblurred image corresponding to the scene based on the image.

2. The method as claimed in claim 1, wherein the pixels of the image sensor corresponding to the one or more portions of the scene are identified based on maximum permissible disparity between the first camera and the second camera.

3. The method as claimed in claim 1, further comprising:
   performing deconvolution of the image to remove motion blur caused by the at least one moving object in the scene, wherein removal of the motion blur from the image generates the deblurred image.

4. The method as claimed in claim 3, wherein information related to a portion of the scene from among the one or more portions of the scene comprises a velocity estimate of a corresponding moving object from among the at least one moving object.

5. The method as claimed in claim 1, further comprising performing, upon determining an absence of the at least one moving object in the scene:
   providing indication of the absence of the at least one moving object in the scene to the second camera; and
   receiving a final image of the scene captured by the second camera, wherein the pixel level shutter is programmed to stay open, for all pixels of the image sensor throughout the duration of the image capture.

6. The method as claimed in claim 5, further comprising:
   receiving a plurality of burst images corresponding to the scene captured within a time period equal to the second exposure time by the first camera, the plurality of burst images comprising the two or more burst images; and
   generating a secondary image corresponding to the scene based on the plurality of burst images by utilizing one or more deghosting algorithms.

7. An apparatus comprising:
   at least one processor; and
   at least one memory comprising computer program code, the at least one memory and the computer program code configured to, with the at least one processor, cause the apparatus to at least perform:
      determine presence of at least one moving object in a scene based on two or more burst images corresponding to the scene captured by a first camera, the two or more burst images are associated with a first exposure time;
      identify one or more portions of the scene associated with the at least one moving object if the at least one moving object is determined to be present in the scene;
      provide information related to the one or more portions of the scene to a second camera, the second camera configured to capture single exposure images associated with a second exposure time, the second exposure time being greater than the first exposure time, wherein the information related to the one or more portions of the scene associated with the at least one moving object is provided substantially instantaneously to the second camera subsequent to the capturing of the two or more burst images;
      receive an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and
      generate a deblurred image corresponding to the scene based on the image.

8. The apparatus as claimed in claim 7, wherein the pixels of the image sensor corresponding to the one or more portions of the scene are identified based on maximum permissible disparity between the first camera and the second camera.

9. The apparatus as claimed in claim 7, wherein the apparatus is further caused, at least in part to:
perform deconvolution of the image to remove motion blur caused by the at least one moving object in the scene, wherein removal of the motion blur from the image generates the deblurred image.

10. The apparatus as claimed in claim 9, wherein information related to a portion of the scene from among the one or more portions of the scene comprises a velocity estimate of a corresponding moving object from among the at least one moving object.

11. The apparatus as claimed in claim 7, wherein the apparatus upon determining an absence of the at least one moving object in the scene is further caused, at least in part to:
provide indication of the absence of the at least one moving object in the scene to the second camera; and
receive a final image of the scene captured by the second camera, wherein the pixel level shutter is programmed to stay open, for all pixels of the image sensor throughout the duration of the image capture.

12. The apparatus as claimed in claim 11, wherein the apparatus is further caused, at least in part to:
receive a plurality of burst images corresponding to the scene captured within a time period equal to the second exposure time by the first camera, the plurality of burst images comprising the two or more burst images; and
generate a secondary image corresponding to the scene based on the plurality of burst images by utilizing one or more deghosting algorithms.

13. A computer program product comprising at least one non-transitory computer-readable storage medium, the non-transitory computer-readable storage medium comprising a set of instructions, which, when executed by one or more processors, cause an apparatus to at least perform:
determine presence of at least one moving object in a scene based on two or more burst images corresponding to the scene captured by a first camera, the two or more burst images are associated with a first exposure time;
identify one or more portions of the scene associated with the at least one moving object if the at least one moving object is determined to be present in the scene;
provide information related to the one or more portions of the scene to a second camera, the second camera configured to capture single exposure images associated with a second exposure time, the second exposure time being greater than the first exposure time, wherein the information related to the one or more portions of the scene associated with the at least one moving object is provided substantially instantaneously to the second camera subsequent to the capturing of the two or more burst images;
receive an image of the scene captured by the second camera, wherein a pixel level shutter disposed in front of an image sensor of the second camera is programmed to periodically open and close, throughout a duration of said image capture, for pixels of the image sensor corresponding to the one or more portions of the scene; and
generate a deblurred image corresponding to the scene based on the image.

14. The computer program product as claimed in claim 13, wherein the pixels of the image sensor corresponding to the one or more portions of the scene are identified based on maximum permissible disparity between the first camera and the second camera.

15. The computer program product as claimed in claim 13, wherein the apparatus is further caused, at least in part to:
perform deconvolution of the image to remove motion blur caused by the at least one moving object in the scene, wherein removal of the motion blur from the image generates the deblurred image.

16. The computer program product as claimed in claim 15, wherein information related to a portion of the scene from among the one or more portions of the scene comprises a velocity estimate of a corresponding moving object from among the at least one moving object.

17. The computer program product as claimed in claim 13, wherein the apparatus upon determining an absence of the at least one moving object in the scene is further caused, at least in part to:
provide indication of the absence of the at least one moving object in the scene to the second camera; and
receive a final image of the scene captured by the second camera, wherein the pixel level shutter is programmed to stay open, for all pixels of the image sensor throughout the duration of the image capture.

* * * * *